US010997519B2

(12) United States Patent
Gunnels et al.

(10) Patent No.: US 10,997,519 B2
(45) Date of Patent: May 4, 2021

(54) CO-SCHEDULING QUANTUM COMPUTING JOBS

(71) Applicant: International Business Machines Corporation, Armonk, NY (US)

(72) Inventors: John A. Gunnels, Somers, NY (US); Mark Wegman, Mt. Kisco, NY (US); David Kaminsky, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

(21) Appl. No.: 16/204,819

(22) Filed: Nov. 29, 2018

(65) Prior Publication Data
US 2020/0174836 A1 Jun. 4, 2020

(51) Int. Cl.
G06F 9/48 (2006.01)
G06N 10/00 (2019.01)

(52) U.S. Cl.
CPC ........... G06N 10/00 (2019.01); G06F 9/4887 (2013.01)

(58) Field of Classification Search
None
See application file for complete search history.

(56) References Cited

U.S. PATENT DOCUMENTS 8,510,741 B2 8/2013 Leiserson et al.
2008/0313430 A1 12/2008 Bunyk
2017/0235605 A1* 8/2017 Chaloupka ............ G06F 9/4881
718/103
2017/0264373 A1 9/2017 Krovi et al.
2017/0351974 A1 12/2017 Rose et al.
2017/0357539 A1 12/2017 Dadashikelayeh et al.
(Continued)

FOREIGN PATENT DOCUMENTS

CN 108874538 A 11/2018
WO 2017152289 A1 9/2017

OTHER PUBLICATIONS

Watson, et al., Solving a Scheduling Problem for a Quantum Computing Architecture Using Constraint Programming, Sandia multiprogram laboratory, 2008, 1 Page.
(Continued)

Primary Examiner — Lewis A Bullock, Jr.
Assistant Examiner — Mark A Gooray
(74) Attorney, Agent, or Firm — Amin, Turocy & Watson, LLP

(57) ABSTRACT

Systems, computer-implemented methods, and computer program products to facilitate quantum computing job scheduling are provided. According to an embodiment, a system can comprise a memory that stores computer executable components and a processor that executes the computer executable components stored in the memory. The computer executable components can comprise a scheduler component that can determine a run order of quantum computing jobs based on one or more quantum based run constraints. The computer executable components can further comprise a run queue component that can store the quantum computing jobs based on the run order. In an embodiment, the scheduler component can determine the run order based on availability of one or more qubits comprising a defined level of fidelity.

25 Claims, 10 Drawing Sheets

┌─ 700

702 — Determining, by a system operatively coupled to a processor, a run order of quantum computing jobs based on one or more quantum based run constraints 704 — Submitting, by the system, at least one of the quantum computing jobs to one or more quantum computing devices based on the run order

(56) References Cited

U.S. PATENT DOCUMENTS

| | | | |
|---|---|---|---|
| 2018/0225186 A1 | 8/2018 | Kelly | |
| 2018/0349183 A1* | 12/2018 | Popovic | G06F 9/5038 |
| 2018/0365585 A1* | 12/2018 | Smith | G06F 9/546 |
| 2019/0220771 A1* | 7/2019 | Boothby | G06F 15/80 |
| 2020/0074346 A1* | 3/2020 | Griffin | G06N 10/00 |

OTHER PUBLICATIONS

Arc Project, Survey on two-dimensional packing, http://cgi.csc.liv.ac.uk/~epa/surveyhtml.html, Last Accessed Nov. 19, 2018.

Mel, et al., The NIST Definition of Cloud Computing, National Institute of Standards and Technology Special Publication 800-145, Sep. 2011, 7 Pages.

International Search Report and Written Opinion received for PCT Application Serial No. PCT/EP2019/081150 dated Dec. 19, 2019, 15 pages.

Guerreschi et al., "Two-Step approach to scheduling quantum circuits", Jul. 31, 2017, pp. 1-15.

* cited by examiner

CO-SCHEDULING QUANTUM COMPUTING JOBS

BACKGROUND

The subject disclosure relates to scheduling quantum computing jobs, and more specifically, to co-scheduling quantum computing jobs based on quantum based run constraints.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Quantum computing hardware is different from classical computing hardware. In particular, superconducting quantum circuits generally rely on Josephson junctions, which can be fabricated in a semiconductor device. A Josephson junction generally manifests the Josephson effect of a supercurrent, where current can flow indefinitely across a Josephson junction without an applied voltage. A Josephson junction can be created by weakly coupling two superconductors (a material that conducts electricity without resistance), for example, by a tunnel barrier.

One way in which a Josephson junction can be used in quantum computing is by embedding the Josephson junction in a superconducting circuit to form a quantum bit (qubit). A Josephson junction can be used to form a qubit by arranging the Josephson junction in parallel with a shunting capacitor. A plurality of such qubits can be arranged on a superconducting quantum circuit fabricated on a semiconductor device. The qubits can be arranged in a lattice (i.e., a grid) formation such that they can be coupled to nearest-neighbor qubits. Such an arrangement of qubits coupled to nearest-neighbor qubits can constitute a quantum computing architecture. An example of an existing quantum computing architecture is the quantum surface code architecture, which can further comprise microwave readout resonators coupled to the respective qubits that facilitate reading quantum information of the qubits (i.e., also referred to as "addressing" or "reading a quantum logic state of the qubit"). Such a quantum surface code architecture can be integrated on a semiconducting device to form an integrated quantum processor that can execute computations and information processing functions that are substantially more complex than can be executed by classical computing devices (e.g., general-purpose computers, special-purpose computers, etc.).

Quantum computing has the potential to solve problems that, due to their computational complexity, cannot be solved, either at all or for all practical purposes, on a classical computer. However, quantum computing requires very specialized skills to, for example, co-schedule quantum computing jobs based on quantum based run constraints, where such quantum computing jobs can be executed by a quantum computing device (e.g., a quantum computer, quantum processor, etc.) based on such a co-schedule. For example, based on such a co-schedule (e.g., also referred to as a run order throughout this disclosure), the quantum computing device can execute a certain quantum computing job using certain qubits.

Many industry experts believe that a common use of quantum computing systems (e.g., quantum computers, quantum processors, etc.) will be as adjuncts to classical computing systems (e.g., cloud based computing systems). As a result, it is likely that quantum computers will become a shared resource, and as with all shared resources, efficient and fair job scheduling becomes important for optimal use of a quantum computer.

It is important to note that quantum computers, unlike classical computers, must run jobs to completion; swapping jobs to disk is not possible. Consequently, efficient scheduling is particularly important. However, efficient scheduling of quantum computing jobs requires consideration of one or more quantum based run constraints unique to quantum computing that are associated with such quantum computing jobs and/or with quantum computing systems that execute such jobs. A problem with existing classical and/or quantum computing job scheduling systems is that they do not account for such quantum based run constraints when scheduling quantum computing jobs to be executed by one or more quantum computing devices (e.g., quantum computer, quantum processor, etc.), which results in inefficient and/or unfair use of such quantum computing devices.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate quantum computing job scheduling are described.

According to an embodiment, a system can comprise a memory that stores computer executable components and a processor that executes the computer executable components stored in the memory. The computer executable components can comprise a scheduler component that can determine a run order of quantum computing jobs based on one or more quantum based run constraints. The computer executable components can further comprise a run queue component that can store references to the quantum computing jobs based on the run order. An advantage of such a system is that it can facilitate efficient and fair scheduling (e.g., co-scheduling) of quantum computing jobs to be executed by one or more quantum computing devices (e.g., quantum computer, quantum processor, etc.) that can be utilized by a plurality of entities (e.g., via a cloud computing environment).

In an embodiment, the scheduler component can determine the run order based on availability of one or more qubits comprising a defined level of fidelity. An advantage of such a system is that it can facilitate accurate solutions to computations executed by one or more quantum computing devices.

According to an embodiment, a computer-implemented method can comprise determining, by a system operatively coupled to a processor, a run order of quantum computing jobs based on one or more quantum based run constraints. The computer-implemented method can further comprise storing, by the system, references to the quantum computing jobs based on the run order. An advantage of such a computer-implemented method is that it can facilitate efficient and fair scheduling (e.g., co-scheduling) of quantum computing jobs to be executed by one or more quantum computing devices (e.g., quantum computer, quantum processor, etc.) that can be utilized by a plurality of entities (e.g., via a cloud computing environment).

In an embodiment, the determining can comprise, determining, by the system, the run order based on availability of one or more qubits comprising a defined level of fidelity. An advantage of such a computer-implemented method is that it can facilitate accurate solutions to computations executed by one or more quantum computing devices.

According to an embodiment, a computer program product that can facilitate a quantum computation job scheduling process is provided. The computer program product can comprise a computer readable storage medium having program instructions embodied therewith, the program instructions can be executable by a processing component to cause the processing component to determine, by the processor, a run order of quantum computing jobs based on one or more quantum based run constraints. The program instructions can also cause the processing component to store, by the processor, references to the quantum computing jobs based on the run order. An advantage of such a computer program product is that it can facilitate efficient and fair scheduling (e.g., co-scheduling) of quantum computing jobs to be executed by one or more quantum computing devices (e.g., quantum computer, quantum processor, etc.) that can be utilized by a plurality of entities (e.g., via a cloud computing environment).

In an embodiment, the program instructions are further executable by the processor to cause the processor to determine, by the processor, the run order based on at least one of: an approximation of runtimes of the quantum computing jobs; availability of one or more qubits comprising a defined level of fidelity; or a defined level of confidence corresponding to correctness of at least one of the quantum computing jobs. An advantage of such a computer program product is that it can facilitate accurate solutions to computations executed by one or more quantum computing devices.

According to an embodiment, a system can comprise a memory that stores computer executable components and a processor that executes the computer executable components stored in the memory. The computer executable components can comprise a scheduler component that can determine a run order of quantum computing jobs based on one or more quantum based run constraints. The computer executable components can further comprise a submit component that can submit at least one of the quantum computing jobs to one or more quantum computing devices based on the run order. An advantage of such a system is that it can facilitate efficient and fair scheduling (e.g., co-scheduling) of quantum computing jobs to be executed by one or more quantum computing devices (e.g., quantum computer, quantum processor, etc.) that can be utilized by a plurality of entities (e.g., via a cloud computing environment).

In an embodiment, the scheduler component can determine the run order based on at least one of: approximations of longest runtimes corresponding to the quantum computing jobs; availability of one or more preferred qubits; or a defined level of confidence corresponding to correctness of at least one of the quantum computing jobs. An advantage of such a system is that it can facilitate accurate solutions to computations executed by one or more quantum computing devices.

According to an embodiment, a computer-implemented method can comprise determining, by a system operatively coupled to a processor, a run order of quantum computing jobs based on one or more quantum based run constraints. The computer-implemented method can further comprise submitting, by the system, at least one of the quantum computing jobs to one or more quantum computing devices based on the run order. An advantage of such a computer-implemented method is that it can facilitate efficient and fair scheduling (e.g., co-scheduling) of quantum computing jobs to be executed by one or more quantum computing devices (e.g., quantum computer, quantum processor, etc.) that can be utilized by a plurality of entities (e.g., via a cloud computing environment).

In an embodiment, the determining can comprise, determining, by the system, the run order based on at least one of: approximations of longest runtimes corresponding to the quantum computing jobs; availability of one or more preferred qubits; or a defined level of confidence corresponding to correctness of at least one of the quantum computing jobs. An advantage of such a computer-implemented method is that it can facilitate accurate solutions to computations executed by one or more quantum computing devices.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the above problem with existing classical and/or quantum computing job scheduling systems that do not account for quantum based run constraints when scheduling quantum computing jobs to be executed by one or more quantum computing devices (e.g., quantum computer, quantum processor, etc.), which results in inefficient and/or unfair use of such quantum computing devices, the present disclosure can be implemented to produce a solution to this problem in the form of a system comprising a scheduler component that can determine a run order of quantum computing jobs based on one or more quantum based run constraints. An advantage of such a system is that it can facilitate efficient and fair scheduling (e.g., co-scheduling) of quantum computing jobs to be executed by one or more quantum computing devices (e.g., quantum computer, quantum processor, etc.) that can be utilized by a plurality of entities (e.g., via a cloud computing environment).

Figure 1:
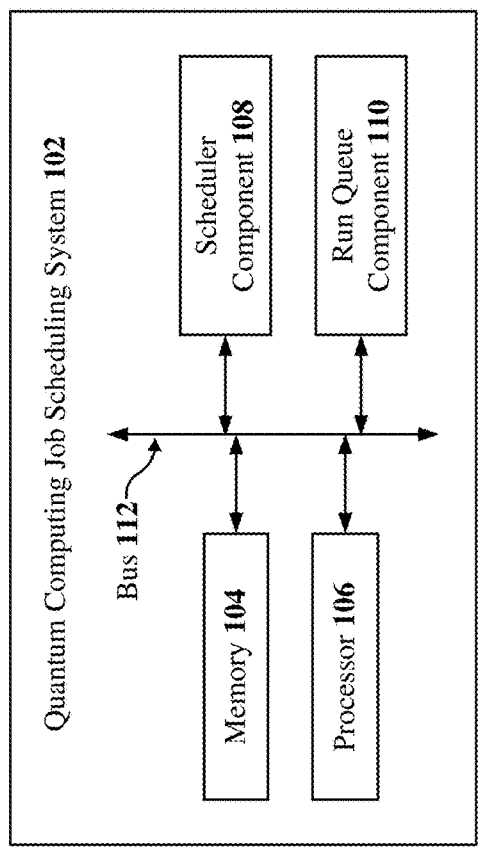
FIG. 1 illustrates a block diagram of an example, non-limiting system that can facilitate quantum computing job scheduling components in accordance with one or more embodiments described herein.

FIG. 1 illustrates a block diagram of an example, non-limiting system 100 that can facilitate quantum computing job scheduling components in accordance with one or more embodiments described herein. In some embodiments, system 100 can comprise a quantum computing job scheduling system 102, which can be associated with a cloud computing environment. For example, quantum computing job scheduling system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1, according to several embodiments, system 100 can comprise a quantum computing job scheduling system 102. In some embodiments, quantum computing job scheduling system 102 can comprise a memory 104, a processor 106, a scheduler component 108, a run queue component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or quantum computing job scheduling system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

According to multiple embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to quantum computing job scheduling system 102, scheduler component 108, run queue component 110, and/or another component associated with quantum computing job scheduling system 102 (e.g., constraint checker component 302, submit component 402, non-starvation component 502, etc.), as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. Further examples of processor 106 are described below with reference to processing unit 814 and FIG. 8. Such examples of processor 106 can be employed to implement any embodiments of the subject disclosure.

In some embodiments, quantum computing job scheduling system 102, memory 104, processor 106, scheduler component 108, run queue component 110, and/or another component of quantum computing job scheduling system 102 as described herein can be communicatively, electrically, and/or operatively coupled to one another via a bus 112 to perform functions of system 100, quantum computing job scheduling system 102, and/or any components coupled therewith. In several embodiments, bus 112 can comprise one or more memory bus, memory controller, peripheral bus, external bus, local bus, and/or another type of bus that can employ various bus architectures. Further examples of bus 112 are described below with reference to system bus 818 and FIG. 8. Such examples of bus 112 can be employed to implement any embodiments of the subject disclosure.

In some embodiments, quantum computing job scheduling system 102 can comprise any type of component, machine, device, facility, apparatus, and/or instrument that comprises a processor and/or can be capable of effective and/or operative communication with a wired and/or wireless network. All such embodiments are envisioned. For example, quantum computing job scheduling system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, quantum computing job scheduling system 102 can be coupled (e.g., communicatively, electrically, operatively, etc.) to one or more external systems, sources, and/or devices (e.g., computing devices, communication devices, etc.) via a data cable (e.g., High-Definition Multimedia Interface (HDMI), recommended standard (RS) 232, Ethernet cable, etc.). In some embodiments, quantum computing job scheduling system 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and wireless networks, including, but not limited to, a cellular network, a wide area network (WAN) (e.g., the Internet) or a local area network (LAN). For example, quantum computing job scheduling system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, quantum computing job scheduling system 102 can thus include hardware (e.g., a central processing unit (CPU), a transceiver, a decoder), software (e.g., a set of threads, a set of processes, software in execution) or a combination of hardware and software that facilitates communicating information between quantum computing job scheduling system 102 and external systems, sources, and/or devices (e.g., computing devices, communication devices, etc.).

According to multiple embodiments, quantum computing job scheduling system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with quantum computing job scheduling system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, scheduler component 108, run queue component 110, and/or any other components associated with quantum computing job scheduling system 102 as disclosed herein (e.g., communicatively, electronically, and/or operatively coupled with and/or employed by quantum computing job scheduling system 102), can comprise such computer and/or machine readable, writable, and/or executable component(s) and/or instruction(s). Consequently, according to numerous embodiments, quantum computing job scheduling system 102 and/or any components associated therewith as disclosed herein, can employ processor 106 to execute such computer and/or machine readable, writable, and/or executable component(s) and/or instruction(s) to facilitate performance of one or more operations described herein with reference to quantum computing job scheduling system 102 and/or any such components associated therewith.

In some embodiments, to implement one or more quantum computing job scheduling operations, quantum computing job scheduling system 102 can facilitate performance of operations executed by and/or associated with scheduler component 108, run queue component 110, and/or another component associated with quantum computing job scheduling system 102 as disclosed herein (e.g., constraint checker component 302, submit component 402, non-starvation component 502, etc.). For example, as described in detail below, quantum computing job scheduling system 102 can facilitate: determining a run order of quantum computing jobs based on one or more quantum based run constraints; storing the quantum computing jobs based on the run order; submitting at least one of the quantum computing jobs to one or more quantum computing devices based on the run order; determining the run order based on an approximation of runtimes of the quantum computing jobs; determining whether the run order violates a qubit communication constraint; determining the run order based on availability of one or more qubits comprising a defined level of fidelity; determining the run order based on a defined level of confidence corresponding to correctness of at least one of the quantum computing jobs; and/or determining the run order based on at least one of: approximations of longest runtimes corresponding to the quantum computing jobs, availability of one or more preferred qubits, or a defined level of confidence corresponding to correctness of at least one of the quantum computing jobs.

According to multiple embodiments, scheduler component 108 can determine a run order of quantum computing jobs based on one or more quantum based run constraints. For example, scheduler component 108 can determine a run order of quantum computing jobs (e.g., pending quantum computing run instances to be executed) that can be executed by one or more quantum computing devices such as, for instance, one or more quantum computers, one or more quantum processors, and/or another quantum computing device. In some embodiments, such a run order can comprise a run schedule comprising references to and/or descriptions of quantum computing jobs (e.g., pending quantum computing run instances to be executed), where such a run schedule can indicate when each quantum computing job can be executed by a certain quantum computer and/or by certain qubits of such quantum computer. In some embodiments, such quantum computing jobs can comprise quantum computing run instances including, but not limited to, computations, data processing, and/or another quantum computing run instance. In some embodiments, such one or more quantum based run constraints can include, but are not limited to, a defined number of qubits required to execute a quantum computing job, a defined number of qubits required to execute a quantum computing job based on error correction, and/or another quantum based run constraint (e.g., as described below with reference to run order 200a, run order 200b, FIG. 2A, and FIG. 2B). In these embodiments, such defined number of qubits required to execute a quantum computing job and/or such defined number of qubits required to execute a quantum computing job based on error correction can be defined by an entity (e.g., a human) using one or more input devices, output devices, and/or a user interface of quantum computing job scheduling system 102 as described below.

In some embodiments, scheduler component 108 can determine a run order of quantum computing jobs based on one or more quantum based run constraints by co-scheduling such quantum computing jobs using one or more bin packing algorithms. For example, scheduler component 108 can employ a bin packing algorithm to co-schedule quantum computing jobs requiring M(i) qubits that can be executed using an N-qubit quantum computer, provided the sum of all qubits used concurrently is less than or equal to N (e.g., sum of all qubits used concurrently ≤N). For instance, scheduler component 108 can employ one or more bin packing algorithms including, but not limited to, one-dimensional (1D) bin packing algorithm, two-dimensional (2D) bin packing algorithm, three-dimensional (3D) bin packing algorithm, best-fit algorithm, first-fit algorithm, best-fit decreasing algorithm, first-fit decreasing algorithm, and/or another bin packing algorithm.

Figure 2A:
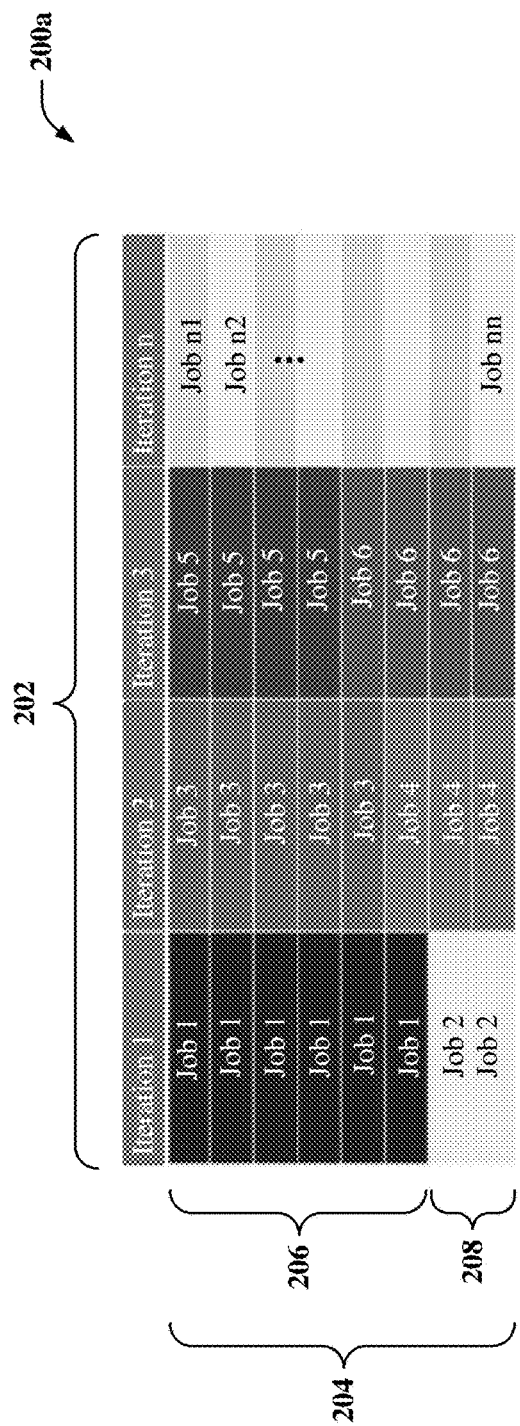
FIG. 2A illustrates an example, non-limiting run order that can facilitate quantum computing job scheduling components in accordance with one or more embodiments described herein.

In some embodiments, scheduler component 108 can determine a run order of quantum computing jobs based on one or more quantum based run constraints by employing one or more bin packing algorithms described above to schedule the quantum computing jobs such that they fit into the smallest number of iterations (e.g., execution cycles). For example, given an N-qubit (e.g., 8 qubits) quantum computer, scheduler component 108 can co-schedule J(i)

quantum computing jobs (e.g., 2 jobs) per iteration, where each job requires M(i) qubits (e.g., as illustrated by run order 200a depicted in FIG. 2A).

FIG. 2A illustrates an example, non-limiting run order 200a that can facilitate quantum computing job scheduling components in accordance with one or more embodiments described herein. Repetitive description of like elements and/or processes employed in various embodiments described herein is omitted for sake of brevity.

According to multiple embodiments, run order 200a can represent a run order (e.g., a run schedule) of J(i) references to pending quantum computing jobs (e.g., quantum computing run instances denoted as Job 1, Job 2, etc. in FIG. 2A) that can be executed over R(i) iterations 202 (e.g., denoted as Iteration 1, Iteration 2, etc. in FIG. 2A) by a quantum computer having a total quantity of total qubits 204, where each quantum computing job requires M(i) qubits. For example, Iteration 1 of run order 200a can comprise references to pending quantum computing jobs Job 1 and Job 2 (e.g., quantum computing run instances), where Job 1 can require six (6) required qubits 206 and Job 2 can require two (2) required qubits 208. In some embodiments, scheduler component 108 can determine run order 200a by employing one or more bin packing algorithms described above to schedule the quantum computing jobs such that they fit into the smallest number of iterations (e.g., execution cycles).

In some embodiments, however, run order 200a does not account for one or more complex quantum computing based constraints (e.g., constraints associated with executing processing workloads using a quantum computer). For example, run order 200a does not account for quantum computing based constraints including, but not limited to: quantum computing jobs (e.g., computations, data processing, etc.) must be executed to completion once started; quantum computing jobs do not all take the same amount of time to execute; not all qubits can communicate directly with one another (e.g., not all qubits are interconnected and/or located in a single quantum computing device); not all quantum computing devices (e.g., quantum computers, quantum processors, etc.) will have the same quantity of qubits; and/or another quantum computing based constraint.

In some embodiments, to address one or more such quantum based constraints described above, scheduler component 108 can determine the run order based on an approximation of runtimes of one or more quantum computing jobs. For example, scheduler component 108 can approximate running time of each quantum computing job using circuit depth of a quantum computer's quantum circuit, where circuit depth can be the quantity of time steps required to complete an execution cycle (e.g., a computation) when the gates acting on discrete qubits operate simultaneously (e.g., circuit depth can describe the maximum length of a directed path starting at the circuit input and ending at the circuit output). In another example, scheduler component 108 can approximate running time of each quantum computing job using running time of previously executed quantum computing jobs that are similar to a current quantum computing job.

In some embodiments, such running time approximation described above can alter the bin packing approach described above where a uniform running time can be assumed to an alternate bin packing approach where scheduler component 108 can determine a run order of quantum computing jobs based on time slices of qubits. For example, scheduler component 108 can determine a run order of quantum computing jobs based on one or more quantum based run constraints by employing one or more bin packing algorithms described above to schedule the quantum computing jobs such that they fit into time slices of qubits (e.g., as illustrated by run order 200b depicted in FIG. 2B), where each quantum computing job begins at a certain time and all required qubits are assigned at such time.

Figure 2B:
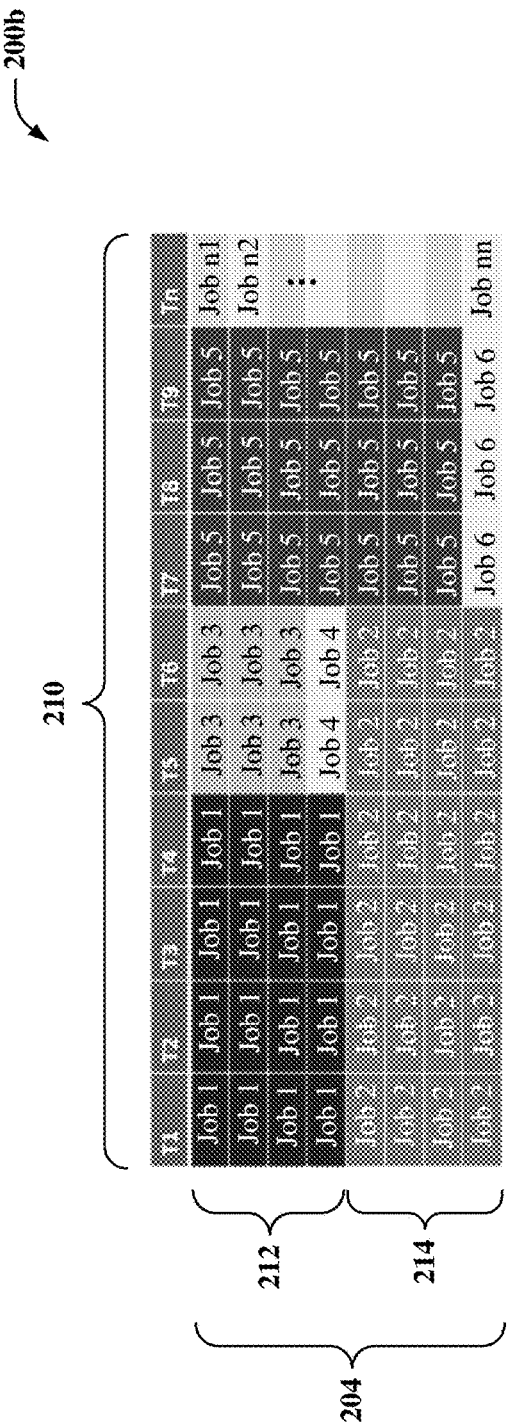
FIG. 2B illustrates an example, non-limiting run order that can facilitate quantum computing job scheduling components in accordance with one or more embodiments described herein.

FIG. 2B illustrates an example, non-limiting run order 200b that can facilitate quantum computing job scheduling components in accordance with one or more embodiments described herein. Repetitive description of like elements and/or processes employed in various embodiments described herein is omitted for sake of brevity.

According to multiple embodiments, run order 200b can represent a run order (e.g., a run schedule) of J(i) references to pending quantum computing jobs (e.g., quantum computing run instances denoted as Job 1, Job 2, etc. in FIG. 2B) that can be executed over T(i) time slices 210 (e.g., denoted as T1, T2, etc. in FIG. 2A) by a quantum computer having a total quantity of total qubits 204, where each quantum computing job requires M(i) qubits. For example, Job 1 of run order 200b can require four (4) required qubits 212 that can execute Job 1 to completion over four (4) time slices T1, T2, T3, and T4. In another example, Job 2 of run order 200b can require four (4) required qubits 214 that can execute Job 2 to completion over six (6) time slices T1, T2, T3, T4, T5, and T6. In some embodiments, scheduler component 108 can determine run order 200b by employing one or more bin packing algorithms described above to schedule the quantum computing jobs such that they fit into time slices of qubits, where each quantum computing job begins at a certain time and all required qubits are assigned at such time.

Returning now to FIG. 1, in some embodiments, a quantum computing based constraint can comprise degradation of qubits over time. For example, existing quantum computing devices (e.g., quantum computers, quantum processors, etc.) can comprise one or more qubits that can degrade over time, which can cause such devices to produce erroneous results for quantum computing jobs (e.g., computations). In some embodiments, to address such a qubit degradation constraint, scheduler component 108 can determine a run order of quantum computing jobs where longer-running jobs are scheduled first, thereby reducing the likelihood that qubit errors occur during a computation. For example, scheduler component 108 can determine a run order such as, for instance, run order 200b depicted in FIG. 2B, where scheduler component 108 can determine a run order such that longer-running jobs (e.g., Job 1 and/or Job 2) are scheduled and executed to completion before shorter-running jobs (e.g., Job 3, Job 4, Job 5, and/or Job 6).

In some embodiments, scheduler component 108 can employ one or more scheduling algorithms to determine a run order of quantum computing jobs where longer-running jobs are scheduled before shorter-running jobs. For example, scheduler component 108 can employ one or more scheduling algorithms including, but not limited to, a longest job first (LJF) scheduling algorithm, a modified version of a shortest job first (SJF) scheduling algorithm (e.g., also known as shortest job next (SJN) or shortest process next (SPN)), and/or another scheduling algorithm that can facilitate scheduling longer-running jobs before shorter-running jobs.

In some embodiments, one or more quantum computing jobs can require execution by one or more qubits having a certain level of fidelity, which can constitute a quantum based run constraint. For example, one or more qubits of a quantum computing device such as, for instance, a quantum computer, can have a level of fidelity that is higher than that of other qubits of such a quantum computer. As referenced herein, the fidelity of a qubit refers to the likelihood and/or degree of error introduced via the application of a quantum logic gate—that is, during the application of a quantum logic gate, higher fidelity qubits experience a lower degree of error, are subject to a lower probability of error or both, when compared to a lower quality qubit. In some embodiments, scheduler component 108 can determine a run order based on availability of one or more qubits comprising a defined level of fidelity. For example, scheduler component 108 can determine a run order of quantum computing jobs based on a level of qubit fidelity that can be defined by an entity (e.g., a human). For instance, quantum computing job scheduling system 102 can comprise one or more input devices (e.g., keyboard, mouse, etc.), one or more output devices (e.g., a monitor), and/or a user interface (e.g., a graphical user interface (GUI)) comprising input controls that can enable an entity (e.g., a human user) to input to scheduler component 108 a qubit fidelity value required for one or more quantum computing jobs. In these embodiments, scheduler component 108 can determine a run order of quantum computing jobs based on such defined level of qubit fidelity by determining that one or more qubits having such a defined level of qubit fidelity are available.

In some embodiments, priority of a quantum computing job can decrease as the confidence in an answer increases, where such priority can constitute a quantum based run constraint. For example, if the standard deviation across shots (e.g., quantum state readouts, quantum logic readouts, etc.) is small (e.g., by some definition of small defined by an entity such as, for instance, a human user), the likelihood that a correct answer has been rendered is statistically higher, and therefore, priority of the quantum computing job can be reduced. In some embodiments, scheduler component 108 can determine the run order based on such priority of one or more quantum computing jobs. For example, scheduler component 108 can determine a run order based on a defined level of confidence corresponding to correctness of at least one of the quantum computing jobs, where such defined level of confidence can be defined by an entity (e.g., a human). For instance, quantum computing job scheduling system 102 can comprise one or more input devices (e.g., keyboard, mouse, etc.), one or more output devices (e.g., a monitor), and/or a user interface (e.g., a graphical user interface (GUI)) comprising input controls that can enable an entity (e.g., a human user) to input to scheduler component 108 a defined level of confidence corresponding to correctness of at least one of the quantum computing jobs. In this example, as a level of confidence corresponding to correctness of a certain quantum computing job(s) meets and/or exceeds the defined level of confidence, scheduler component 108 can reduce a level of priority associated with such certain quantum computing job(s) and determine a run order of all quantum computing jobs based on such reduced priority associated with such certain quantum computing job(s).

In some embodiments, scheduler component 108 can determine one or more second run orders based on: one or more second quantum based run constraints corresponding to second quantum computing jobs; and/or completion of at least one of the quantum computing jobs. For example, based on receiving a new quantum computing job request having quantum based run constraints corresponding thereto, scheduler component 108 can determine a new run order of quantum computing jobs based on the new and previous quantum based run constraints, where such new run order can comprise the new quantum computing job and previous quantum computing jobs that have not been completely executed. In another example, based on complete execution of a previous quantum computing job(s), scheduler component 108 can determine a new run order of the remaining unexecuted quantum computing job(s), where such new run order can reflect removal of the completely executed quantum computing job(s).

According to multiple embodiments, run queue component 110 can store references to quantum computing jobs based on a run order. For example, run queue component 110 can store references to quantum computing jobs (e.g., quantum computing run instances to be executed) based on a run order (e.g., run order 200b) determined by scheduler component 108 (e.g., as described above with reference to FIG. 2B). For instance, run queue component 110 can store a run schedule comprising references to pending quantum computing run instances to be executed by one or more quantum computing devices and/or one or more certain qubits of such devices.

In some embodiments, run queue component 110 can store such references to quantum computing jobs on a memory such as, for example, memory 104. In some embodiments, memory 104 can comprise run queue component 110 (not illustrated in FIG. 1). For instance, run queue component 110 can comprise a run queue of memory 104, where run queue component 110 can store such references to quantum computing jobs based on a run order.

In some embodiments, run queue component 110 can store references to quantum computing jobs (e.g., on run queue component 110 and/or memory 104) such that the references to quantum computing jobs are arranged in the order (e.g., sequential order) the quantum computing jobs are to run (e.g., in the order the quantum computing jobs are to be executed by a quantum computing device), where such an ordered arrangement can be based on a run order (e.g., run order 200b) determined by scheduler component 108. In some embodiments, such an ordered arrangement (e.g., sequential order) of references to quantum computing jobs stored by run queue component 110 (e.g., on run queue component 110 and/or memory 104 as described above) can establish a level of priority associated with each quantum computing job. For example, a location (e.g., first, last, etc.) of a certain reference to a certain quantum computing job within such an ordered arrangement can be indicative of a level of priority corresponding to such a certain quantum computing job, where such level of priority can be relative to all other quantum computing jobs in the ordered arrangement. In some embodiments, such a level of priority can be modified by one or more components of quantum computing job scheduling system 102 (e.g., via non-starvation component 502 as described below with reference to FIG. 5).

Figure 3:
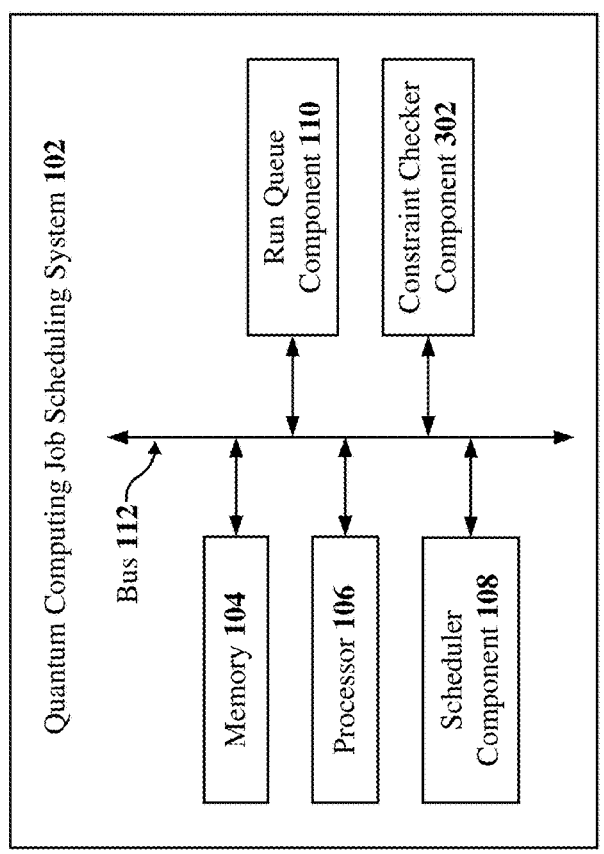
FIG. 3 illustrates a block diagram of an example, non-limiting system that can facilitate quantum computing job scheduling components in accordance with one or more embodiments described herein.

FIG. 3 illustrates a block diagram of an example, non-limiting system 300 that can facilitate quantum computing job scheduling components in accordance with one or more embodiments described herein. Repetitive description of like elements and/or processes employed in various embodiments described herein is omitted for sake of brevity.

According to multiple embodiments, to address the quantum based run constraints described above that not all qubits can communicate directly with one another, constraint checker component 302 can determine whether a run order violates a qubit communication constraint. For example, constraint checker component 302 can determine whether a run order determined by scheduler component 108 (e.g., as described above with reference to FIG. 1) violates a qubit communication constraint by applying (e.g., overlaying) a check constraint application to such a run order.

In some embodiments, to determine whether a run order violates a qubit communication constraint, constraint checker component 302 can determine whether all qubits required to execute a certain quantum computing job (e.g., required qubits 212 of run order 200b depicted in FIG. 2B) are coupled to one another such that they can communicate directly with one another (e.g., transfer quantum information to one another). For example, constraint checker component 302 can analyze one or more quantum circuits (e.g., circuit quantum electrodynamics (circuit QED)) of one or more quantum computing devices such as, for example, quantum computers, to determine whether certain qubits required to execute a certain quantum computing job (e.g., required qubits 212) are electrically, communicatively, and/or operatively coupled to one another. For instance, constraint checker component 302 can analyze such quantum circuits to determine whether such certain qubits (e.g., required qubits 212) are inductively coupled to one another, conductively coupled to one another (e.g., via a resonant bus, a resonant line, a waveguide, a transmission line, etc.), capacitively coupled to one another, and/or coupled to one another in another manner that can facilitate direct communication between such qubits.

In some embodiments, if a run order determined by scheduler component 108 proposes an allocation of a quantum computing job to certain qubits violates a communication constraint, constraint checker component 302 can reject such a run order. For example, if such a run order proposes an allocation of a quantum computing job to certain qubits of a quantum computing device (e.g., a quantum computer) that do not communicate directly with one another, constraint checker component 302 can reject such a run order. In another example, if such a run order proposes an allocation of a quantum computing job to certain qubits of different quantum computing devices (e.g., certain qubits located in different quantum computers), constraint checker component 302 can reject such a run order.

Figure 4:
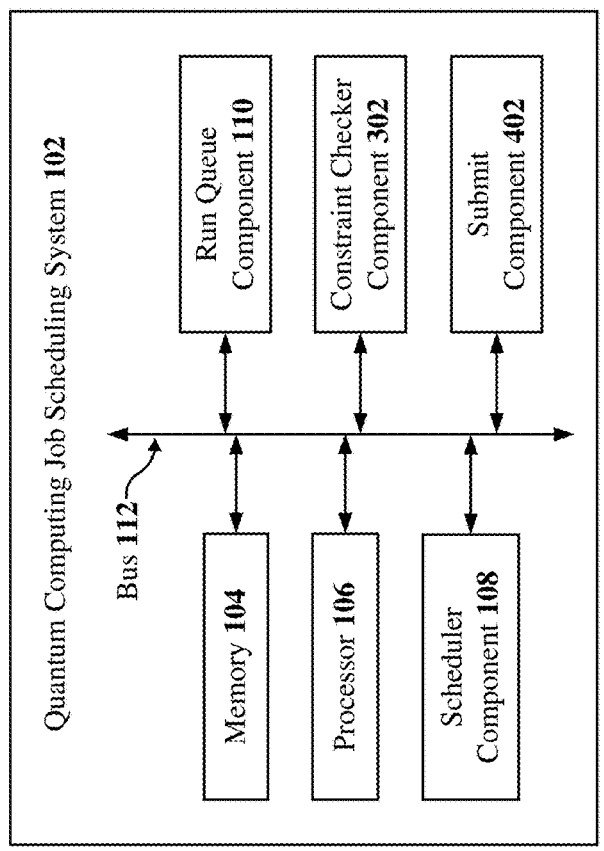
FIG. 4 illustrates a block diagram of an example, non-limiting system that can facilitate quantum computing job scheduling components in accordance with one or more embodiments described herein.

FIG. 4 illustrates a block diagram of an example, non-limiting system 400 that can facilitate quantum computing job scheduling components in accordance with one or more embodiments described herein. Repetitive description of like elements and/or processes employed in various embodiments described herein is omitted for sake of brevity.

According to multiple embodiments, submit component 402 can submit at least one quantum computing job to one or more quantum computing devices based on a run order. For example, submit component 402 can select from a run queue (e.g., run queue component 110) a quantum computing job based on a run order (e.g., run order 200b depicted in FIG. 2B) determined by scheduler component 108 (e.g., as described above), where such run order can indicate which quantum computing job submit component 402 can select at each selection time. In this example, submit component 402 can further submit such a quantum computing job to a quantum computing device (e.g., quantum computer, quantum processor, etc.), which can be indicated in the run order and such quantum computing device can execute the quantum computing job to completion.

In some embodiments, to facilitate submitting a quantum computing job to a quantum computing device based on a run order, submit component 402 can employ a priority scheduling algorithm, where each quantum computing job can have a level of priority corresponding thereto that can be indicated in the run order determined by scheduler component 108. For example, submit component 402 can employ a priority scheduling algorithm utilized in a classical computer and/or a modified version thereof to select from a run queue (e.g., run queue component 110) a quantum computing job having the highest level of priority corresponding thereto (e.g., as indicated in a run order determined by scheduler component 108). In this example, based on such selection using a priority scheduling algorithm, submit component 402 can submit (e.g., via a data cable and/or a network such as, for example, the Internet) such a quantum computing job to a quantum computing device (e.g., a quantum computer, quantum processor, etc.), where such quantum computing device can execute the quantum computing job to completion.

Figure 5:
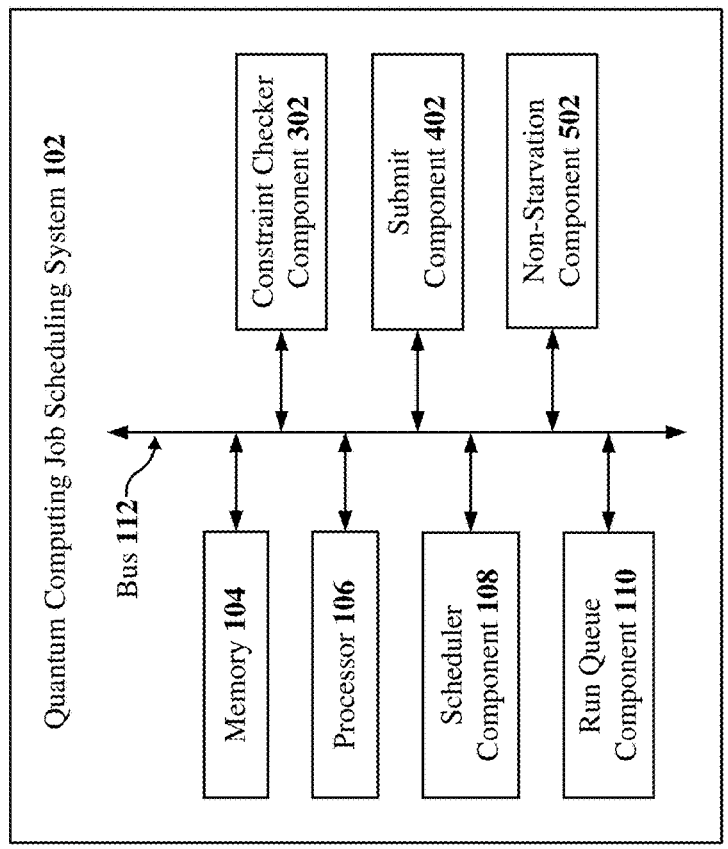
FIG. 5 illustrates a block diagram of an example, non-limiting system that can facilitate quantum computing job scheduling components in accordance with one or more embodiments described herein.

FIG. 5 illustrates a block diagram of an example, non-limiting system 500 that can facilitate quantum computing job scheduling components in accordance with one or more embodiments described herein. Repetitive description of like elements and/or processes employed in various embodiments described herein is omitted for sake of brevity.

According to multiple embodiments, non-starvation component 502 can determine whether all quantum computing jobs are executed within a defined time. For example, non-starvation component 502 can determine whether all quantum computing jobs included in a run order (e.g., run order 200b depicted in FIG. 2B) are executed within a defined time, where such defined time can be defined by an entity (e.g., a human using one or more input devices, output devices, and/or a user interface of quantum computing job scheduling system 102 as described above with reference to FIG. 1).

In some embodiments, based on non-starvation component 502 determining that a quantum computing job has not been executed within a defined time, non-starvation component 502 can facilitate execution of such an unexecuted quantum computing job, even if such execution results in a suboptimal use of resources (e.g., quantum computers, quantum processors, etc.). For example, based on non-starvation component 502 determining that a quantum computing job has not been executed within a defined time, non-starvation component 502 can prompt submit component 402 to submit such an unexecuted quantum computing job to a quantum computing device that can execute the quantum computing job. For instance, based on submit component 402 utilizing a priority scheduling algorithm and/or a modified version thereof, non-starvation component 502 can increase a priority level associated with such unexecuted quantum computing job, thereby prompting submit component 402 to submit such unexecuted quantum computing job to a quantum computing device.

In some embodiments, quantum computing job scheduling system 102 can be a quantum computing job scheduling system and/or process associated with various technologies. For example, quantum computing job scheduling system 102 can be associated with classical computer workload scheduling technologies, quantum computer workload scheduling technologies, quantum mechanics technologies, quantum computation technologies, quantum computer technologies, quantum hardware and/or software technologies, quantum simulator technologies, classical domain and/or quantum domain data processing technologies, machine learning technologies, artificial intelligence technologies, and/or other technologies.

In some embodiments, quantum computing job scheduling system 102 can provide technical improvements to systems, devices, components, operational steps, and/or processing steps associated with the various technologies identified above. For example, quantum computing job scheduling system 102 can determine a run order of quantum computing jobs based on one or more quantum based run constraints including, but not limited to: quantum computing jobs (e.g., computations, data processing, etc.) must be executed to completion once started; quantum computing jobs do not all take the same amount of time to execute; not all qubits can communicate directly with one another (e.g., not all qubits are interconnected and/or located in a single quantum computing device); not all quantum computing devices (e.g., quantum computers, quantum processors, etc.) will have the same quantity of qubits; and/or another quantum computing based constraint. In this example, existing classical computer job scheduling technologies cannot account for such quantum based run constraints when scheduling quantum computing jobs to be executed by a quantum computing device.

In some embodiments, quantum computing job scheduling system 102 can also provide technical improvements to a quantum computing system and/or device by improving accuracy of solutions to quantum computing jobs executed by such quantum computing system and/or device (e.g., quantum computer, quantum processor, etc.). For example, quantum computing job scheduling system 102 can determine a run order that allocates quantum computing jobs to certain quantum computing devices having a defined level of fidelity (e.g., a high level of fidelity). In this example, quantum computing job scheduling system 102 can thereby facilitate improved processing accuracy of a processing unit associated with such quantum computing system and/or device executing the quantum computing jobs. For instance, quantum computing job scheduling system 102 can facilitate such improved processing accuracy of such processing unit by improving the accuracy of solutions to quantum computations executed by such processing unit (e.g., a quantum processor).

In some embodiments, quantum computing job scheduling system 102 can provide technical improvements to a processing unit associated with a quantum computing system and/or device. For example, by determining a run order that allocates quantum computing jobs to certain quantum computing devices and/or certain qubits based on quantum based run constraints, quantum computing job scheduling system 102 can optimize operation of such a quantum computing system and/or device. In this example, by optimizing operation of such a quantum computing system and/or device, quantum computing job scheduling system 102 can optimize operation of a processing unit associated with such quantum computing system and/or device, thereby facilitating improved processing performance and/or processing efficiency of such a processing unit by reducing the number of processing cycles and/or an aggregate amount of processing time of such processing unit.

In some embodiments, quantum computing job scheduling system 102 can employ hardware and/or software to solve problems that are highly technical in nature, that are not abstract and that cannot be performed as a set of mental acts by a human. In some embodiments, some of the processes described herein may be performed by one or more specialized computers (e.g., one or more quantum computer, quantum processing units, etc.) for carrying out defined tasks related to scheduling quantum computing jobs based on quantum based run constraints. In some embodiments, quantum computing job scheduling system 102 and/or components thereof, can be employed to solve new problems that arise through advancements in technologies mentioned above (e.g., quantum computing), employment of cloud-computing systems, computer architecture, and/or another technology.

It is to be appreciated that quantum computing job scheduling system 102 can perform a quantum computing job scheduling process utilizing various combinations of electrical components, mechanical components, and circuitry that cannot be replicated in the mind of a human or performed by a human. For example, determining a run order of quantum computing jobs based on one or more quantum based run constraints described above and/or determining a run order that allocates quantum computing jobs to certain quantum computing devices having a defined level of fidelity (e.g., a high level of fidelity), are operations that are greater than the capability of a human mind. For instance, the amount of data processed, the speed of processing such data, and/or the types of data processed by quantum computing job scheduling system 102 over a certain period of time can be greater, faster, and/or different than the amount, speed, and/or data type that can be processed by a human mind over the same period of time.

According to several embodiments, quantum computing job scheduling system 102 can also be fully operational towards performing one or more other functions (e.g., fully powered on, fully executed, etc.) while also performing the above-referenced quantum computing job scheduling process. It should be appreciated that such simultaneous multi-operational execution is beyond the capability of a human mind. It should also be appreciated that quantum computing job scheduling system 102 can include information that is impossible to obtain manually by an entity, such as a human user. For example, the type, amount, and/or variety of information included in scheduler component 108, run queue component 110, constraint checker component 302, submit component 402, and/or non-starvation component 502 can be more complex than information obtained manually by a human user.

Figure 6:
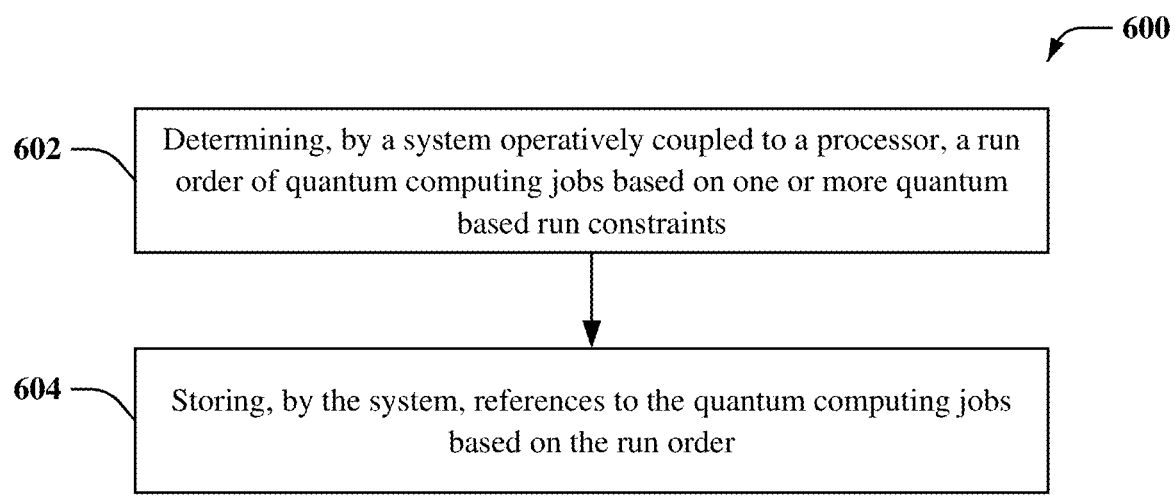
FIG. 6 illustrates a flow diagram of an example, non-limiting computer-implemented method that can facilitate quantum computing job scheduling components in accordance with one or more embodiments described herein.

FIG. 6 illustrates a flow diagram of an example, non-limiting computer-implemented method 600 that can facilitate quantum computing job scheduling components in accordance with one or more embodiments described herein. Repetitive description of like elements and/or processes employed in various embodiments described herein is omitted for sake of brevity.

At 602, determining, by a system (e.g., quantum computing job scheduling system 102 and/or scheduler component 108) operatively coupled to a processor (e.g., processor 106), a run order (e.g., run order 200b) of quantum computing jobs (e.g., computations, data processing, etc.) based on one or more quantum based run constraints. In some embodiments, such one or more quantum based run constraints can comprise constraints associated with executing processing workloads using a quantum computer. For example, such one or more quantum based run constraints can include, but are not limited to: a defined number of qubits required to execute a quantum computing job; a defined number of qubits required to execute a quantum computing job based on error correction; quantum computing jobs must be executed to completion once started; quantum computing jobs do not all take the same amount of time to execute; not all qubits can communicate directly with one another (e.g., not all qubits are interconnected and/or located in a single quantum computing device); not all quantum computing devices (e.g., quantum computers, quantum processors, etc.) will have the same quantity of qubits; and/or another quantum computing based constraint.

At 604, storing, by the system (e.g., quantum computing job scheduling system 102, run queue component 110, and/or memory 104), references to the quantum computing jobs based on the run order. In some embodiments, run queue component 110 can store references to quantum computing jobs (e.g., on run queue component 110 and/or memory 104) such that the references to quantum computing jobs are arranged in the order (e.g., sequential order) the quantum computing jobs are to run (e.g., in the order the quantum computing jobs are to be executed by a quantum computing device), where such an ordered arrangement can be based on a run order (e.g., run order 200b) determined by scheduler component 108.

Figure 7:
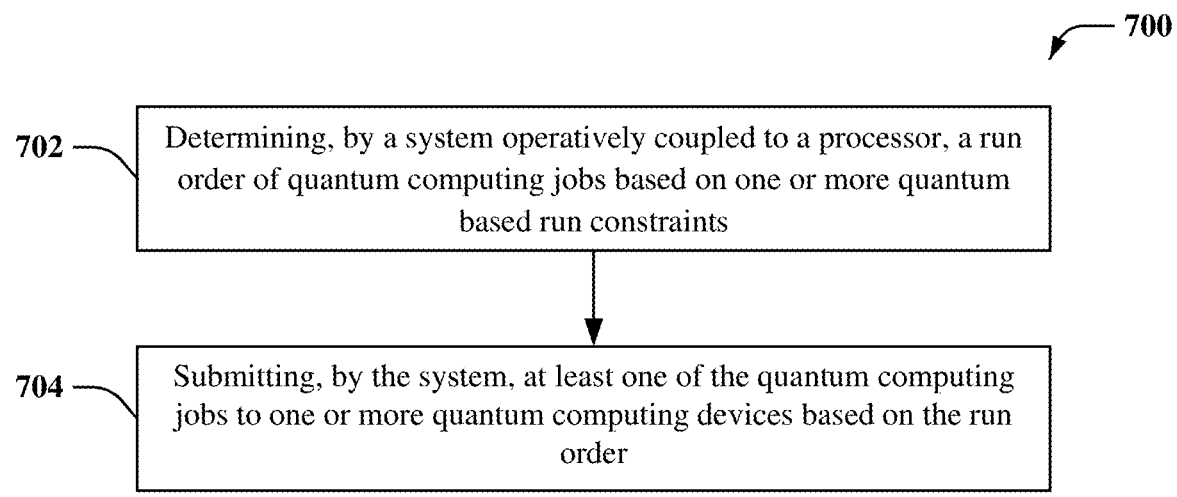
FIG. 7 illustrates a flow diagram of an example, non-limiting computer-implemented method that can facilitate quantum computing job scheduling components in accordance with one or more embodiments described herein.

FIG. 7 illustrates a flow diagram of an example, non-limiting computer-implemented method 700 that can facilitate quantum computing job scheduling components in accordance with one or more embodiments described herein. Repetitive description of like elements and/or processes employed in various embodiments described herein is omitted for sake of brevity.

At 702, determining, by a system (e.g., quantum computing job scheduling system 102 and/or scheduler component 108) operatively coupled to a processor (e.g., processor 106), a run order (e.g., run order 200b) of quantum computing jobs (e.g., computations, data processing, etc.) based on one or more quantum based run constraints. In some embodiments, such one or more quantum based run constraints can comprise constraints associated with executing processing workloads using a quantum computer. For example, such one or more quantum based run constraints can include, but are not limited to: a defined number of qubits required to execute a quantum computing job; a defined number of qubits required to execute a quantum computing job based on error correction; quantum computing jobs must be executed to completion once started; quantum computing jobs do not all take the same amount of time to execute; not all qubits can communicate directly with one another (e.g., not all qubits are interconnected and/or located in a single quantum computing device); not all quantum computing devices (e.g., quantum computers, quantum processors, etc.) will have the same quantity of qubits; and/or another quantum computing based constraint.

At 704, submitting, by the system (e.g., quantum computing job scheduling system 102 and/or submit component 402), at least one of the quantum computing jobs to one or more quantum computing devices (e.g., quantum computers, quantum processors, etc.) based on the run order.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
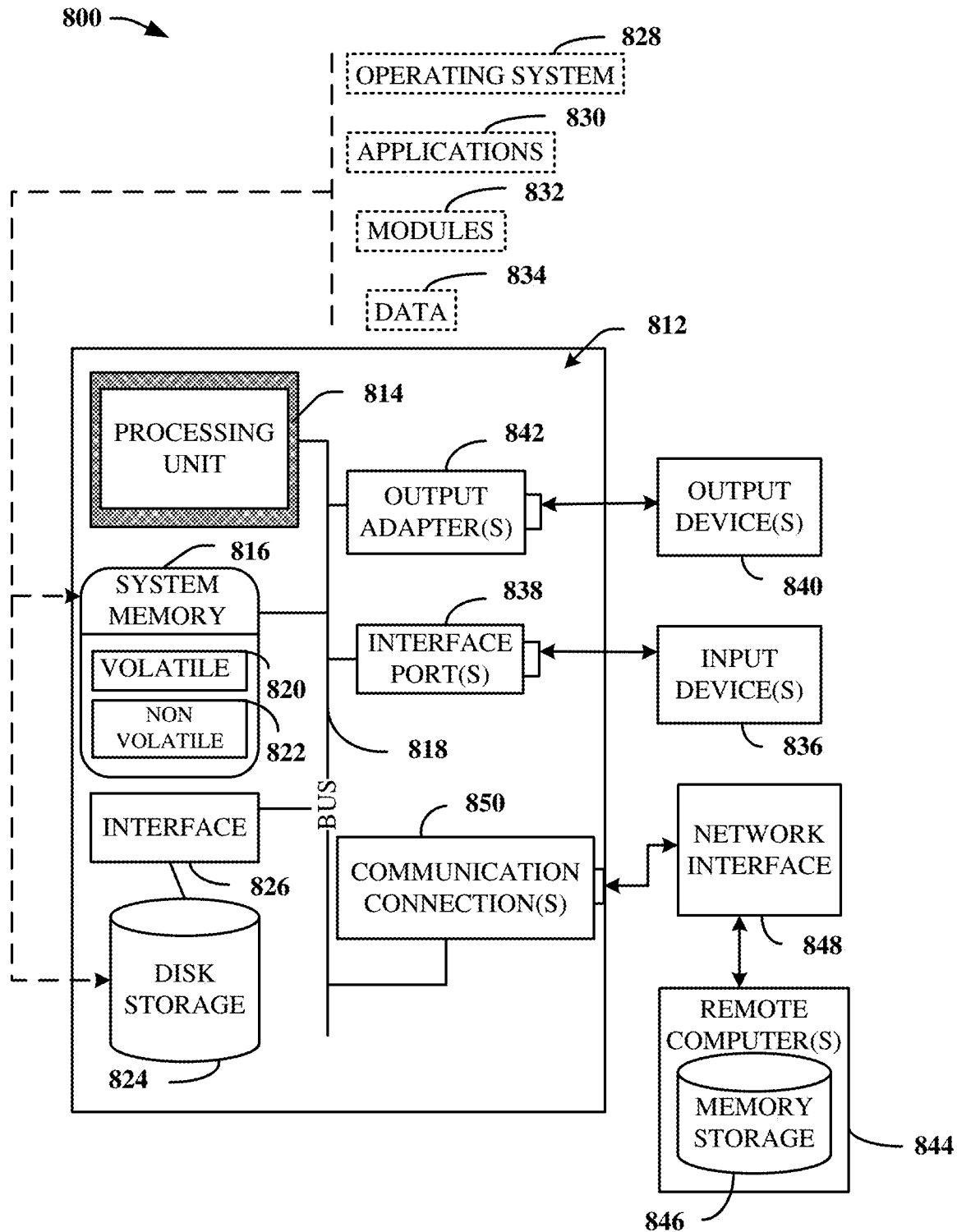
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection (s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
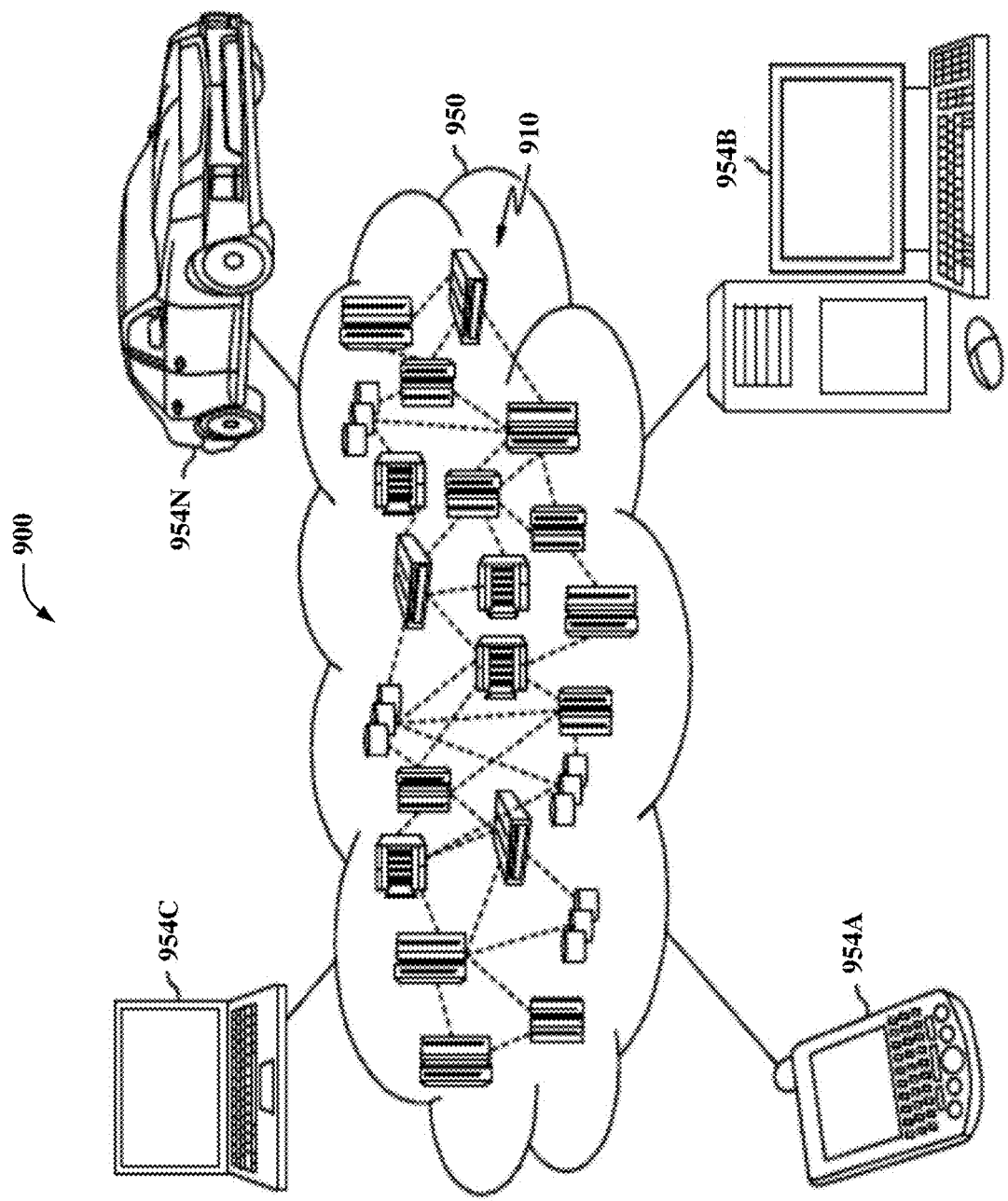
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
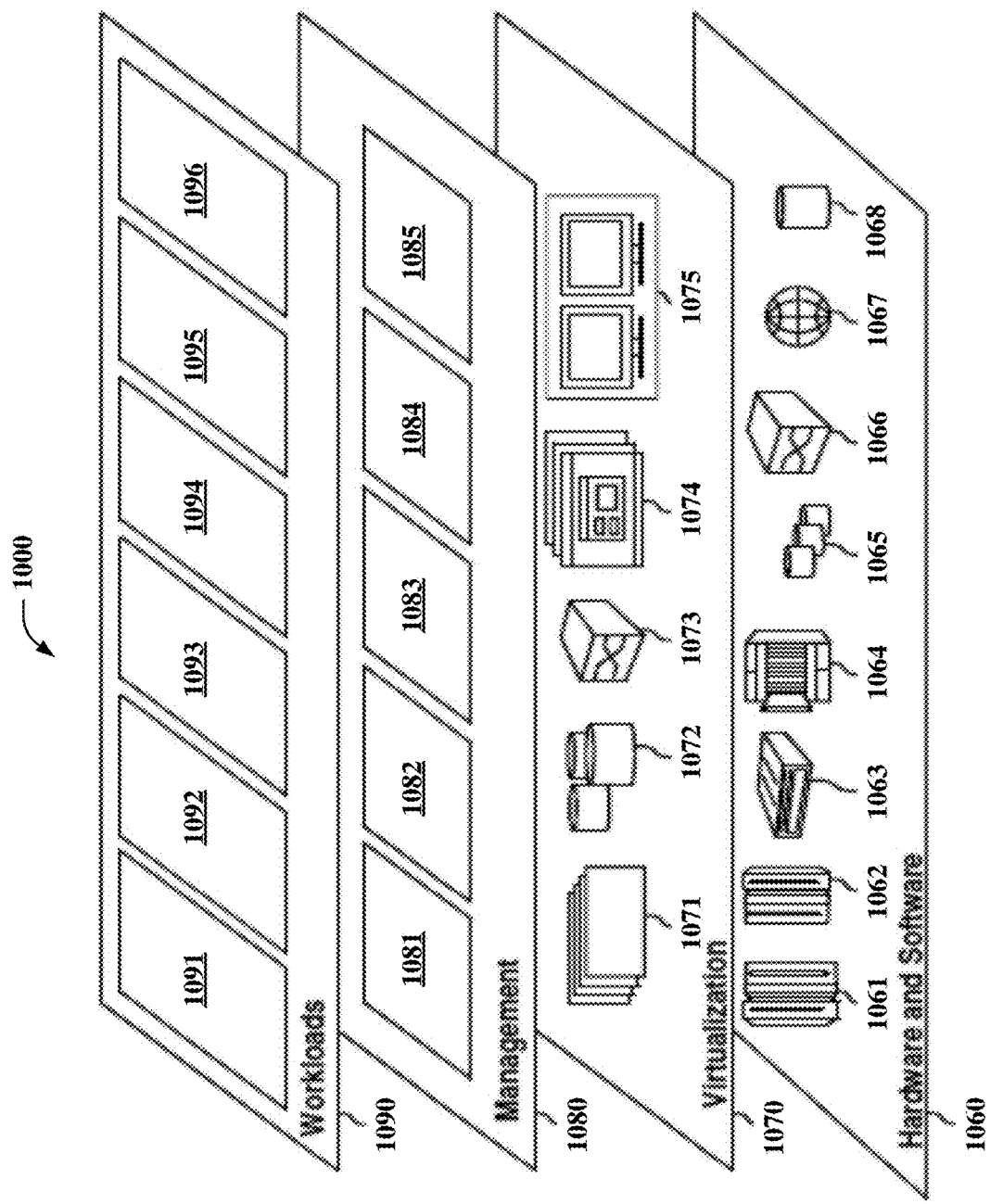
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and quantum computing job scheduling software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   a scheduler component that:
   determines respective approximated runtimes for quantum computing jobs based on a circuit depth of a quantum circuit, wherein the circuit depth is based on a directed path from a circuit input of the quantum circuit to a circuit output of the quantum circuit representing a quantity of time to complete an execution cycle when a plurality of gates of the quantum circuit act on a plurality of qubits of the quantum circuit to operate simultaneously, determines, using a bin-packing algorithm, a run order of quantum computing jobs based on one or more quantum based run constraints, the respective approximated runtimes for the quantum computing jobs, and availability of one or more qubits comprising a defined level of fidelity;

a run queue component that stores references to the quantum computing jobs based on the run order; and a submit component that executes at least one of the quantum computing jobs using one or more quantum computing devices based on the run order.

2. The system of claim 1, wherein run order facilitates improved processing efficiency of at least one of the processor or the one or more quantum computing devices.

3. The system of claim 1, wherein the scheduler component determines, using the bin-packing algorithm, the run order further based on time slices of qubits of the quantum circuit.

4. The system of claim 1, wherein the computer executable components further comprise:

a constraint checker component that determines whether the run order violates a qubit communication constraint.

5. The system of claim 1, wherein the scheduler component determines one or more second run orders based on at least one of: one or more second quantum based run constraints corresponding to second quantum computing jobs, or completion of at least one of the quantum computing jobs.

6. The system of claim 1, wherein the computer executable components further comprise:

a non-starvation component that determines whether all the quantum computing jobs are executed within a defined time.

7. The system of claim 1, wherein the run order facilitates improved processing accuracy of at least one of: the processor; or a processing unit associated with one or more quantum computing devices executing the quantum computing jobs based on the run order.

8. The system of claim 1, wherein the scheduler component determines, using the bin-packing algorithm, the run order further based on a defined level of confidence corresponding to correctness of at least one of the quantum computing jobs.

9. The system of claim 1, wherein the one or more quantum based run constraints comprises at least one of: a defined number of qubits to execute a quantum computing job, or a defined number of qubits to execute a quantum computing job based on error correction.

10. A computer implemented method, comprising:

determining, by a system operatively coupled to a processor, respective approximated runtimes for quantum computing jobs based on a circuit depth of a quantum circuit, wherein the circuit depth is based on a directed path from a circuit input of the quantum circuit to a circuit output of the quantum circuit representing a quantity of time to complete an execution cycle when a plurality of gates of the quantum circuit act on a plurality of qubits of the quantum circuit to operate simultaneously;

determining, by the system using a bin-packing algorithm, a run order of quantum computing jobs based on one or more quantum based run constraints, the respective approximated runtimes for the quantum computing jobs, and availability of one or more qubits comprising a defined level of fidelity;

storing, by the system, references to the quantum computing jobs based on the run order; and executing, by the system, at least one of the quantum computing jobs using one or more quantum computing devices based on the run order.

11. The computer implemented method of claim 10, wherein the run order facilitates improved processing efficiency of at least one of the processor or the one or more quantum computing devices.

12. The computer implemented method of claim 10, wherein the determining comprises determining the run order further based on time slices of qubits of the quantum circuit.

13. The computer implemented method of claim 10, further comprising:

determining, by the system, whether the run order violates a qubit communication constraint.

14. The computer implemented method of claim 10, wherein the run order facilitates improved processing accuracy of at least one of: the processor; or a processing unit associated with one or more quantum computing devices executing the quantum computing jobs based on the run order.

15. The computer implemented method of claim 10, wherein the determining comprises determining the run order further based on a defined level of confidence corresponding to correctness of at least one of the quantum computing jobs.

16. A computer program product facilitating a quantum computing job scheduling process, the computer program product comprising a computer readable storage medium having program instructions embodied therewith, the program instructions executable by a processor to cause the processor to:

determining, by the processor, respective approximated runtimes for quantum computing jobs based on a circuit depth of a quantum circuit, wherein the circuit depth is based on a directed path from a circuit input of the quantum circuit to a circuit output of the quantum circuit representing a quantity of time to complete an execution cycle when a plurality of gates of the quantum circuit act on a plurality of qubits of the quantum circuit to operate simultaneously, determine, by the processor using a bin-packing algorithm, a run order of quantum computing jobs based on one or more quantum based run constraints, the respective approximated runtimes for the quantum computing jobs, and availability of one or more qubits comprising a defined level of fidelity;

store, by the processor, references to the quantum computing jobs based on the run order; and execute, by the processor, at least one of the quantum computing jobs using one or more quantum computing devices based on the run order.

17. The computer program product of claim 16, wherein the run order facilitates improved processing efficiency of at least one of the processor or the one or more quantum computing devices.

18. The computer program product of claim 16, wherein the program instructions are further executable by the processor to cause the processor to:

determine, by the processor using the bin-packing algorithm, the run order further based on a defined level of confidence corresponding to correctness of at least one of the quantum computing jobs.

19. The computer program product of claim 16, wherein the program instructions are further executable by the processor to cause the processor to:

determine, by the processor, whether the run order violates a qubit communication constraint.

20. A system, comprising:
a memory that stores computer executable components; and
a processor that executes the computer executable components stored in the memory, wherein the computer executable components comprise:
a scheduler component that:
determines respective approximated runtimes for quantum computing jobs based on a circuit depth of a quantum circuit, wherein the circuit depth is based on a directed path from a circuit input of the quantum circuit to a circuit output of the quantum circuit representing a quantity of time to complete an execution cycle when a plurality of gates of the quantum circuit act on a plurality of qubits of the quantum circuit to operate concurrently,
determines, using a bin-packing algorithm, a run order of quantum computing jobs based on one or more quantum based run constraints, the respective approximated runtimes for the quantum computing jobs, and availability of one or more qubits comprising a defined level of fidelity; and
a submit component that executes at least one of the quantum computing jobs using one or more quantum computing devices based on the run order.

21. The system of claim 20, wherein the one or more quantum computing devices comprise one or more quantum computing devices of a cloud computing environment.

22. The system of claim 20, wherein the scheduler component determines, using the bin-packing algorithm, the run order further based on at least one of: availability of one or more preferred qubits, or a defined level of confidence corresponding to correctness of at least one of the quantum computing jobs.

23. The system of claim 20, wherein the one or more quantum based run constraints comprises at least one of: a defined number of qubits to execute a quantum computing job; or a defined number of qubits to execute a quantum computing job based on error correction.

24. A computer implemented method, comprising:
determining, by a system operatively coupled to a processor, respective approximated runtimes for quantum computing jobs based on a circuit depth of a quantum circuit, wherein the circuit depth is based on a directed path from a circuit input of the quantum circuit to a circuit output of the quantum circuit representing a quantity of time to complete an execution cycle when a plurality of gates of the quantum circuit act on a plurality of qubits of the quantum circuit to operate concurrently;
determining, by the system using a bin-packing algorithm, a run order of quantum computing jobs based on one or more quantum based run constraints, the respective approximated runtimes for the quantum computing jobs, and availability of one or more qubits comprising a defined level of fidelity; and
executing, by the system, at least one of the quantum computing jobs using one or more quantum computing devices based on the run order.

25. The computer implemented method of claim 24, wherein the determining comprises determining-the run order further based on at least one of: availability of one or more preferred qubits, or a defined level of confidence corresponding to correctness of at least one of the quantum computing jobs.

* * * * *